United States Patent [19] [11] 4,346,389

Nagayama [45] Aug. 24, 1982

[54] MULTIPLE CHARGE ELECTRODE DEVICE FOR LIQUID JET PRINTER

[75] Inventor: Haruhiko Nagayama, Machida, Japan

[73] Assignee: Ricoh Co., Ltd., Tokyo, Japan

[21] Appl. No.: 192,090

[22] Filed: Sep. 29, 1980

[30] Foreign Application Priority Data

| | | | |
|---|---|---|---|
| Oct. 11, 1979 | [JP] | Japan | 54/129918 |
| Oct. 11, 1979 | [JP] | Japan | 54/129919 |
| Nov. 9, 1979 | [JP] | Japan | 54/145096 |

[51] Int. Cl.³ .......... G01D 15/18

[52] U.S. Cl. .......... 346/75

[58] Field of Search .......... 346/75, 140 R, 140 PD

[56] References Cited

U.S. PATENT DOCUMENTS

| | | | |
|---|---|---|---|
| 4,096,626 | 6/1978 | Olsen et al. | 346/75 X |
| 4,194,211 | 3/1980 | Hoffman et al. | 346/75 |
| 4,223,320 | 9/1980 | Paranjpe et al. | 346/75 |

*Primary Examiner*—Joseph W. Hartary

*Assistant Examiner*—W. J. Brady

*Attorney, Agent, or Firm*—Burgess, Ryan and Wayne

[57] ABSTRACT

In a multiple charge electrode device for a liquid jet printer of the type in which a charge electrode unit, a shield plate and a charge sensor plate unit are overlaid, the charge electrode unit or said charge sensor plate unit has a single insulating substrate, a plurality of slots or notches formed along one side of said single insulating substrate, a plurality of charge electrodes or charge sensor plates formed by metalizing the periphery and inner surfaces of each slot or notch, and a plurality of shield electrodes each disposed between the adjacent charge electrodes or charge sensor plates. The shield plate is made of a metal or alloy sheet and provided with a plurality of slots or notches which are aligned with the corresponding slots or notches of the charge electrode and charge sensor plate units and are smaller in dimension than the latter. The shield plate is interposed between the charge electrode and charge sensor plate units.

2 Claims, 17 Drawing Figures

MULTIPLE CHARGE ELECTRODE DEVICE FOR LIQUID JET PRINTER

BACKGROUND OF THE INVENTION

The present invention relates to a multiple charge electrode device for a liquid jet printer.

Because of the structure requirements, the thickness of a charge sensor plate in the multiple charge electrode device is small in the direction of the trajectory of the liquid or ink drops. The sensor electrode is formed by bonding thin-film electrode plates previously printed or otherwise formed on printed circuit boards. As a result, misalignment occurs between the apertures through which a stream of liquid or ink drops passes, so that variations in output from the sensor plates occur in response to the same charge.

The prior art multiple charge electrode device has a further problem in that a liquid or ink drop is charged excessively because of the voltage interferences from the adjacent charge electrodes. As a result, a misplacement of liquid or ink drop occurs, so that the quality of the reproduced image is degraded.

SUMMARY OF THE INVENTION

In view of the above, the primary object of the present invention is to provide a multiple charge electrode device which can substantially overcome the above and other problems encountered in the prior art multiple charge electrode devices.

According to the present invention, a charge electrode unit, a shield plate and a charge sensor plate unit are overlaid or stacked in the order named. The charge electrode unit has a single insulating substrate, a plurality of slots or notches formed along one side of the substrate, a plurality of thin-film charge electrodes formed at the periphery and inner surface of each slot or notch by metalization or the like, and a plurality of shield electrodes each disposed between the adjacent charge electrodes. The charge sensor plate unit is substantially similar in construction to the charge electrode unit. The shield plate is made of a metal or alloy sheet and has a plurality of slots or notches along only one side thereof which are aligned with the corresponding slots or notches of the charge electrode and charge sensor plate units. The former slots or notches are smaller in size than the latter slots or notches so that more effective shielding effects can be attained. Moreover, the charge electrode unit, the shield plate, the sensor plate unit and the shield plate are stacked in the order named so that shielding effects are further pronounced.

The shield electrodes serve to avoid or minimize the electrostatic interferences between the adjacent charge electrodes or sensor plates.

The above and other objects, effects and features of the present invention will become more apparent from the following description of preferred embodiments thereof taken in conjunction with the accompanying drawings.

DESCRIPTION OF THE PRIOR ART

Figure 1A:
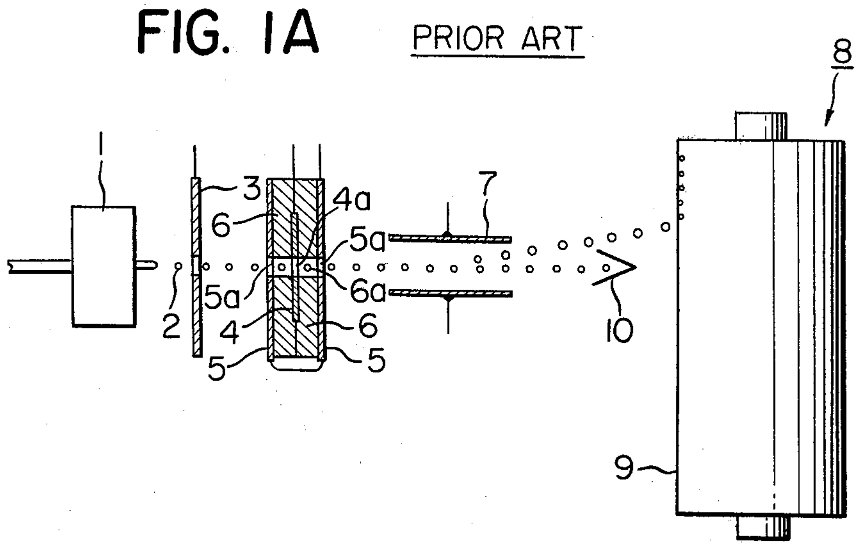
FIG. 1A PRIOR ART
FIGS. 1A and 1B are a schematic longitudinal sectional view of a prior art liquid jet printer.
Figure 1B:
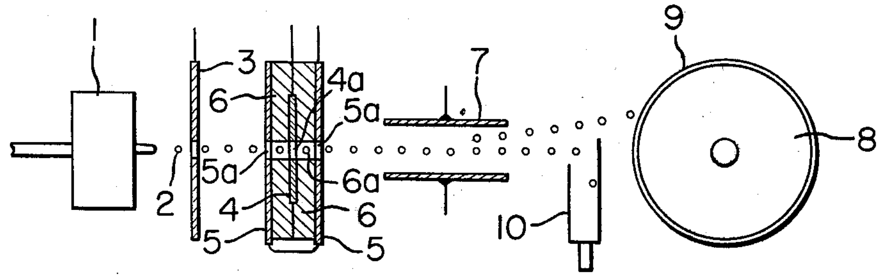
FIG. 1B PRIOR ART

In FIGS. 1A and 1B are shown prior art liquid jet printers with an array of charge electrodes. Reference numeral 1 denotes a nozzle head or an ink manifold; 2, ink drops spaced apart from each other by a predetermined distance; 3, a charge electrode for selectively charging the ink drops 2; 4, a sensor plate for detecting whether each ink drop is charged or not; 5, a shield plates for electrostatically shielding the sensor plate 4; the sensor plate 4 being sandwiched between printed circuit boards 6 bonded together while the shield plates 5 being bonded to the outer surfaces of the printed circuit boards 6; 7, a pair of deflection plates for deflecting the charged ink drops; 8, a drum; 9, a recording medium wrapped around the drum 8; and 10, a gutter for trapping the ink drops except those steered to the recording medium 9.

The charge electrode 3 charges an ink drop depending upon the desired angle of deflection and the charge on the ink drop is sensed by the sensor plate. The charged ink drop is deflected by the deflection plates 7, the angle of deflection being dependent upon the charge on the ink drop 2. The deflected ink drop lands on the recording medium 9 and an image is reproduced by the ink drops thus deposited. Except for those ink drops steered to the recording medium 9, the ink drops are collected by the gutter 10 for recirculation.

The prior art printer of the type described above has some problems. First, since the sensor plate 4 is small in thickness in the direction of the ink drop trajectory the charge on every ink drop cannot be measured with a high degree of accuracy, and sometimes the ink drops pass the sensor plate 4 undetected. Second, since the sensor plate 4 is formed by bonding the boards 6 each having printed circuit patterns on both major surfaces, the surface of the sensor plate 4 tends to become uneven because of misalignment. As a result, errors in detection occur. In addition, the diameter of the aperture 4*a* of the sensor plate 4 is equal to or smaller than that of the apertures 5*a* of the shield plates 5. Therefore, if the charge electrode 3 and the deflection plates 7 are disposed very close to the sensor plate 4, the electrostatic shielding effects caused by the shield plates 5 are decreased. If the distances between the sensor electrode 4 on the one hand and between the charge electrode 3 and the deflection plates 7 on the other hand are increased in order to enhance the shielding effects, the response of the sensor plate 4 becomes slow and the overall dimensions of the print head must be increased.

In the case of multiple ink jet printing, such charge electrodes and sensor plates as described above are arrayed in line, but no means is provided for preventing electrostatic interference between them. As a result, because of the influence of the voltages applied on the adjacent charge electrodes, one ink drop acquires more charge than is desired, and consequently is deflected more than is intended, so that an ink drop misplacement results and the quality of the image is degraded.

DESCRIPTION OF THE PREFERRED EMBODIMENTS

First Embodiment, FIGS. 2 through 6

Figure 2:
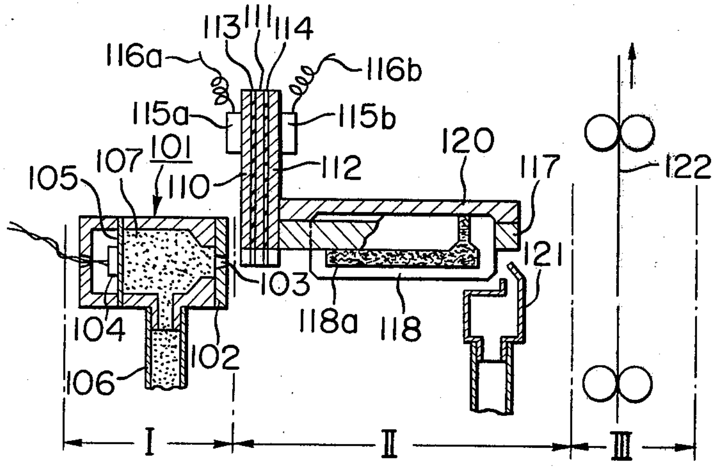
FIG. 2 is a longitudinal sectional view of a multiple ink jet printer incorporating a first embodiment of a multiple charge electrode device in accordance with the present invention.

In FIG. 2 is shown in section an ink jet printer incorporating a charge electrode and sensor plate array in accordance with the present invention. The printer comprises in general an ink drop generator I, a charge deflection unit II and a recording sheet transport unit III. The ink drop generator I is mounted on a stationary supporting member (not shown) while the unit II is disposed in such a way that it can be retracted upwardly of the trajectories of ink drops by a suitable means (not shown) before or after the printing so that the charge electrodes, the sensor plates and the deflection plate pairs are prevented from being contaminated by the ink drops which become sluggish when the ink drop generator I starts or stops generating ink drops.

The ink drop generator I comprises in general an ink manifold 101, an orifice plate 102 with a large number of orifices or nozzles 103, a piezoelectric driver 104 mounted on a diaphragm 105 and an ink feed tube 106. As is well known in the art, when the pressure in the ink manifold 101 is increased to a few kilograms per square centimeter, the ink 107 issues thrugh the orifices 103.

The charge deflection unit II comprises in general a charge electrode unit 110, a sensor plate unit 111, an insulating plate 112, shielding plates 113 and 114, a charge signal connector 115*a*, a charge sensor connector 115*b*, a multiconductor cable 116*a* for transmitting the charge signals, a multiconductor cable 116*b* for transmitting the output signals each representative of the sensed charge on each ink drop, a deflection plate unit holder 117, deflection plate units 118, an electrode protector 120 and a gutter 121.

The sensor plate unit 111 is electrostatically shielded from the charging voltage and the deflection voltage by the shielding plates 113 and 114. The upper surface of the deflection plate unit holder 117 is covered with the protector 120, which is made of epoxy resin or the like, so that the contacts to the thin-film deflection plates 118*a* on the deflection plate units 118 can be avoided.

As is well known in the art, the ink drops issued from the ink drop generator I are selectively charged and deflected by the deflection plate pairs through an angle which is dependent upon the charge on each ink drop. The deflected ink drops are steered toward the recording sheet 122 and land at a predetermined position, thus forming an image. Uncharged ink drops are collected by the gutter 121 for recirculation.

Figure 3:
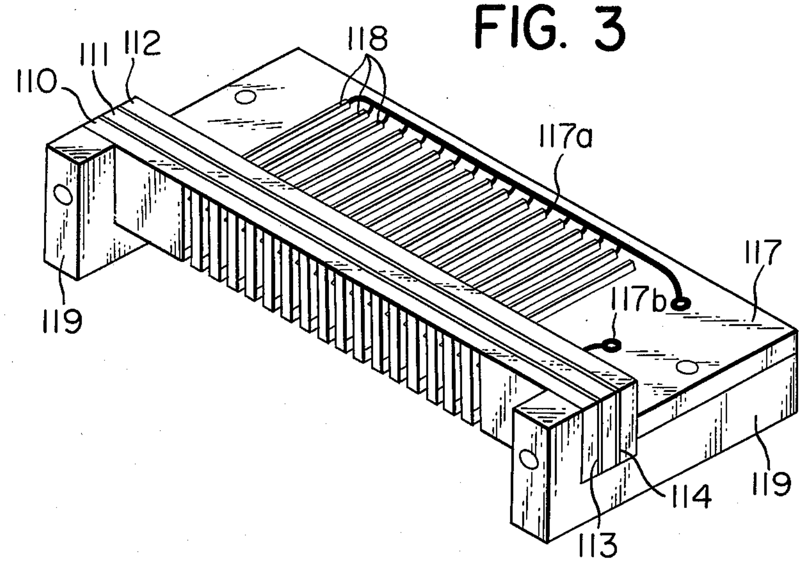
FIG. 3 is a perspective view of a charge deflection unit II of the printer shown in FIG. 2.

In FIG. 3 is shown in detail the charge deflection unit II with the protector 120 removed. The charge electrode unit 110, the sensor plate unit 111, the insulating plate 122, the shielding plates 113 and 114 and the deflection plate unit holder 117 are all securely mounted on unit holders 119 as a unitary construction.

Figure 4:
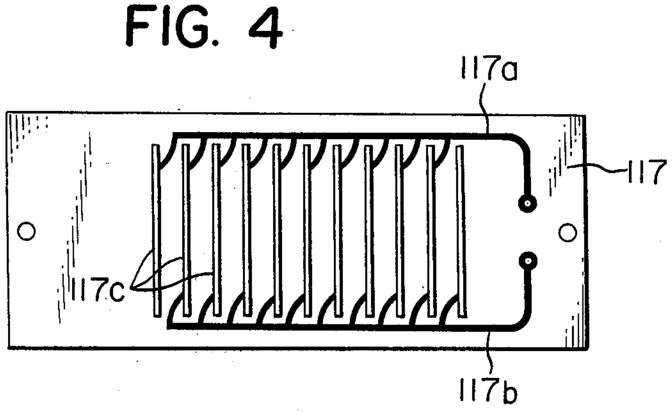
FIG. 4 is a top view of a deflection electrode unit holder.

In FIG. 4 is shown in detail the deflection plate unit holder 117. The holder 117 is made of an insulating substrate such as glass and a connection pattern with two connection lines 117*a* and 117*b* is formed on the top surface of the holder 117 by a suitable process such as electroplating or vacuum evaporation. Connection branches are extended from the connection lines 117*a* and 117*b* and terminated at the slots 117*c* into which are inserted the deflection plate units 118.

Figure 5:
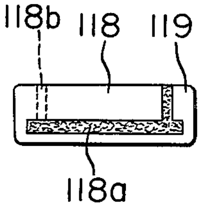
FIG. 5 is a front view of a deflection plate unit.

In FIG. 5 is shown in detail the deflection plate unit 118. The unit 118 is made of an insulating substrate such as glass or ceramic and deflection plate patterns 118*a* and 118*b* are formed on the major surfaces, respectively. When the deflection plate units 118 are inserted into the slots 117*c* of the holder 117, the connection branches of the connecting lines 117*a* and 117*b* are electrically connected to the patterns 118*a* and 118*b*, whereby a deflection plate array is provided.

Figure 6:
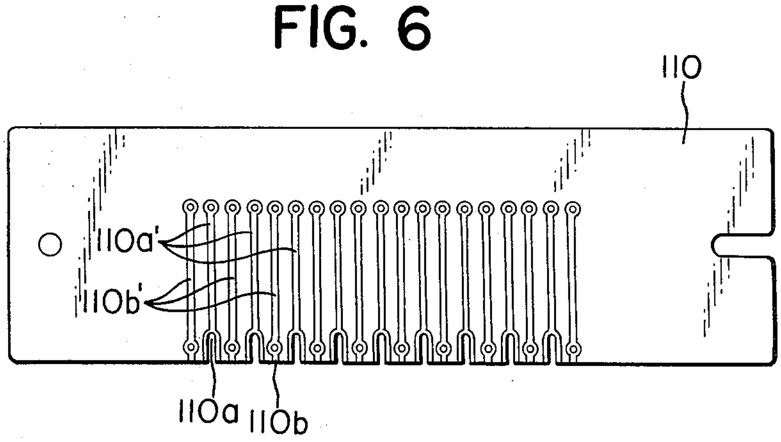
FIG. 6 is a front view of a charge electrode unit or a charge sensor plate unit in accordance with the present invention.
Figure 7A:
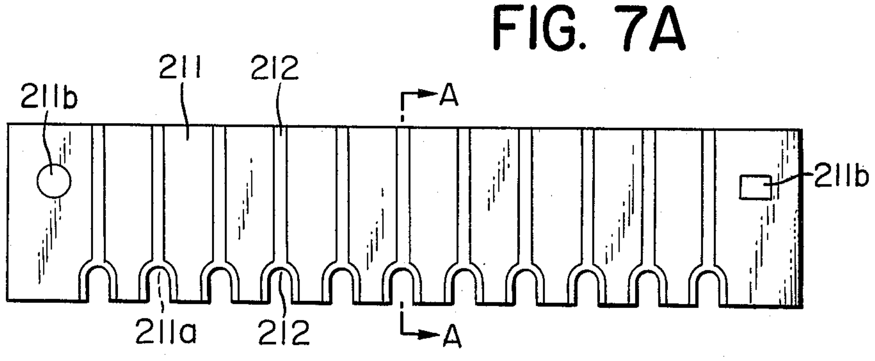
FIG. 7A is a front view of a charge electrode unit or a charge sensor plate unit of a second embodiment of the present invention.
Figure 7C:
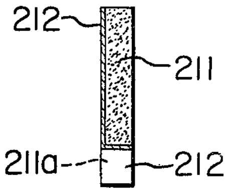
FIG. 7C is a sectional view taken along the line A—A of FIG. 7A.
Figure 7B:
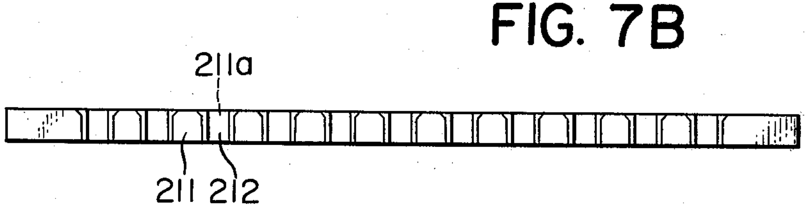
FIG. 7B is a bottom view thereof.
Figure 8A:
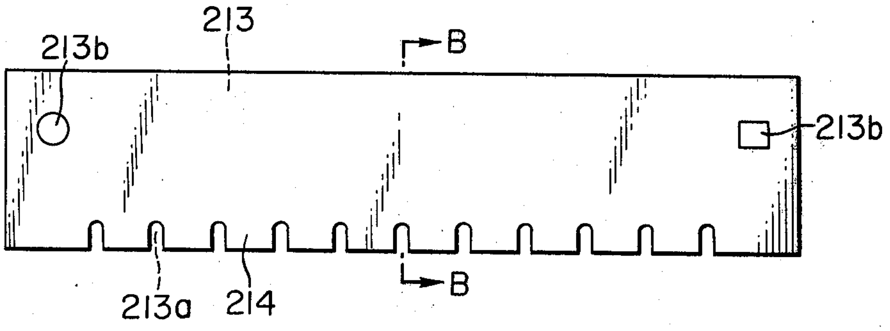
FIG. 8A is a front view of a shield plate used in the second embodiment.
Figure 8B:
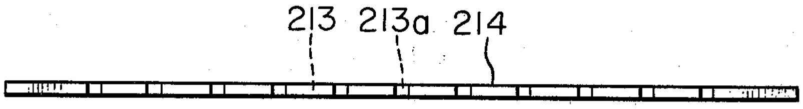
FIG. 8B is a bottom view thereof.
Figure 8C:
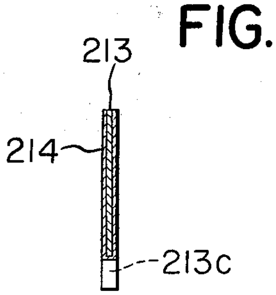
FIG. 8C is a sectional view taken along the line B—B of FIG. 8A.
Figure 9:
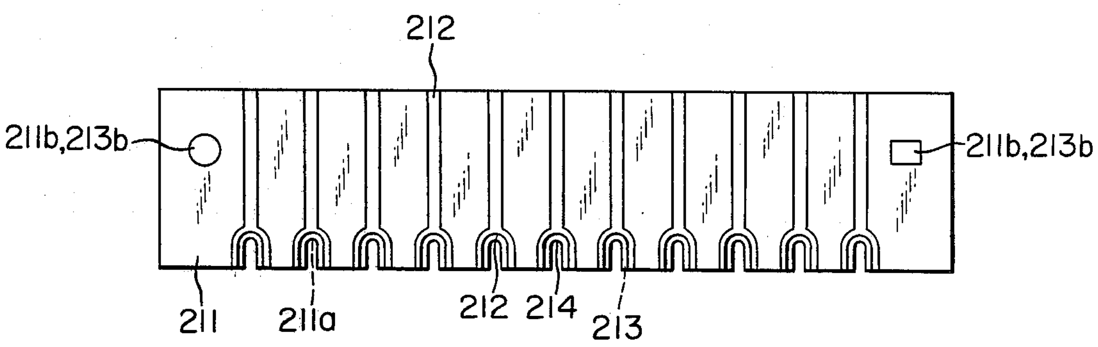
FIG. 9 is a front view of the second embodiment.

In FIG. 6 is shown the charge electrode unit 110 or the sensor plate unit 111. Since these units 110 and 111 are substantially similar in construction, it will suffice to describe only the charge electrode unit 110. The substrate of the charge electrode unit 110 is made of a chemically etchable, photosensitive glass such as a photosensitive glass containing lithium. When the substrate is exposed through a mask to the ultraviolet rays, the crystals of lithium metasilicate ($Li_2O.SiO_2$) are precipitated. Since these crystals are easily dissolved in diluted fluorine (2–10%), the substrate is immersed in a bath of flourine after exposure and heating so that only the exposed areas are removed. Therefore, a plurality of equally spaced slots 110*a* and a plurality of equally spaced holes 110*b* are alternately formed through the substrate by the above-described photolithographic process. The inner wall surfaces of these slots 110*a* and holes 110*b* are completely electro-plated, whereby charge electrodes and shielding electrodes are provided. Thereafter, thin-film connection lines or lands 110*a'* and 110*b'* are formed over the surface of the substrate and connected to the charge electrodes and the shielding electrodes, respectively. Thus there is provided the charge electrode plate or unit with a charge electrode array or the sensor plate unit with a sensor plate array in which the electrodes are spaced apart by a predetermined pitch with a high degree of accuracy, and interference from the adjacent electrodes is minimized.

In summary, according to the first embodiment of the present invention, the charge electrode unit with an array of charge electrodes and an array of shielding electrodes or the sensor plate unit with an array of sensor plates and an array of shielding electrodes can be very simple in construction and fabricated through simple steps. In addition, they have a higher degree of interchangeability and a higher degree of electrode pitch accuracy. Moreover, interference between the charge electrodes or sensor plates can be minimized.

Second Embodiment, FIGS. 7 through 10

Referring to FIGS. 7 through 10, 211 is a charge electrode unit or a charge sensor plate unit made of an insulating substrate and formed with a plurality of equally spaced apertures 211*a* each for passing a stream of ink drops and two mounting holes 211*b*. 212 is a thin-film charge electrode or sensor plate pattern formed by printing, plating or vacuum evaporation of an electrically conductive material over the major surface of the substrate and the inner surface of each aperture 211*a*.

Referring to FIGS. 8A through 8C, 213 is a shield plate made of a metal or an alloy and formed with a plurality of equally spaced apertures 213*a* each for passing a stream of ink drops and two mounting holes 213*b*. The width of the aperture 213*a* is smaller than that of the aperture 211*a* of the charge electrode unit or the sensor electrode unit 211 shown in FIG. 7. The shield plate 213 is completely coated with an insulating material 214.

Figure 10:
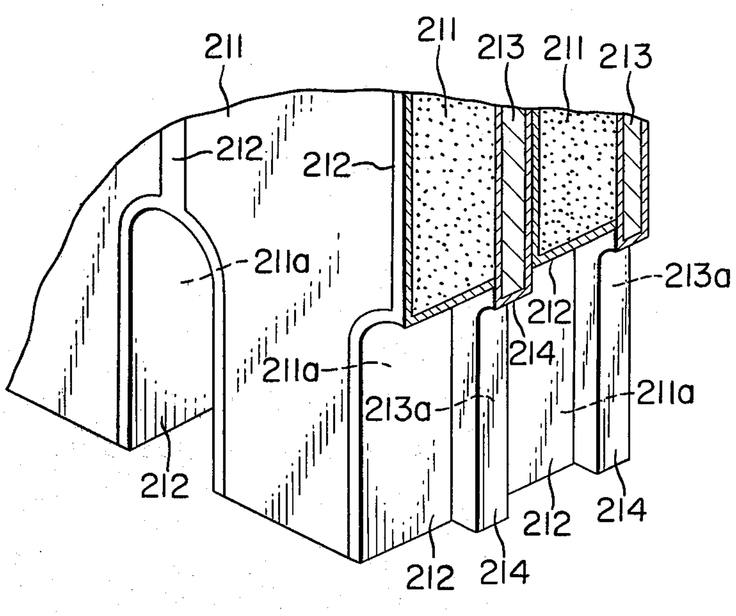
FIG. 10 is a fragmentary perspective view, partly in section, thereof.

Two charge electrode units 212 and two shield plates 213 are alternately overlaid as best shown in FIG. 10 and assembled into a unitary construction with joining means (not shown) extended through the mounting holes 211*b* and 213*b*. One of the units 212 which is sandwiched between the shield plates 213 is used as the charge sensor plate unit; that is, the thin-film conductor patterns 212 are used as the charge sensor plates. The other unit 212 is used as the charge electrode unit; that is, the patterns 212 are used as the charge electrodes.

The charge electrode unit or the sensor plate unit 211 and the shield plate 213 may have only one aperture each.

In summary, according to the second embodiment, the length of the charge sensor plate in the direction of the trajectory of ink drops can be varied by varying the thickness of the unit 211 so that the charge on each ink drop can be sensed with a high degree of accuracy. In addition, failures of detection can be avoided. Since the surface of the sensor plate can be made flat and smooth by virtue of the screen printing, plating or vacuum evaporation process, the variations in output from the sensor plates in response to the same charge can be avoided. Furthermore, the apertures 213*a* are smaller in width than the apertures 211*a* so that the shield plates 213 are extended to some extent into the passage of ink drops defined by the apertures 211*a* as best shown in FIG. 10. As a result, the effects of electrostatic shielding can be improved and because of the improved shielding effects, the charge electrodes can be disposed adjacently to the charge sensor electrodes. Thus the charge detection response time can be shortened and the printer can be made very compact in size.

Figure 11:
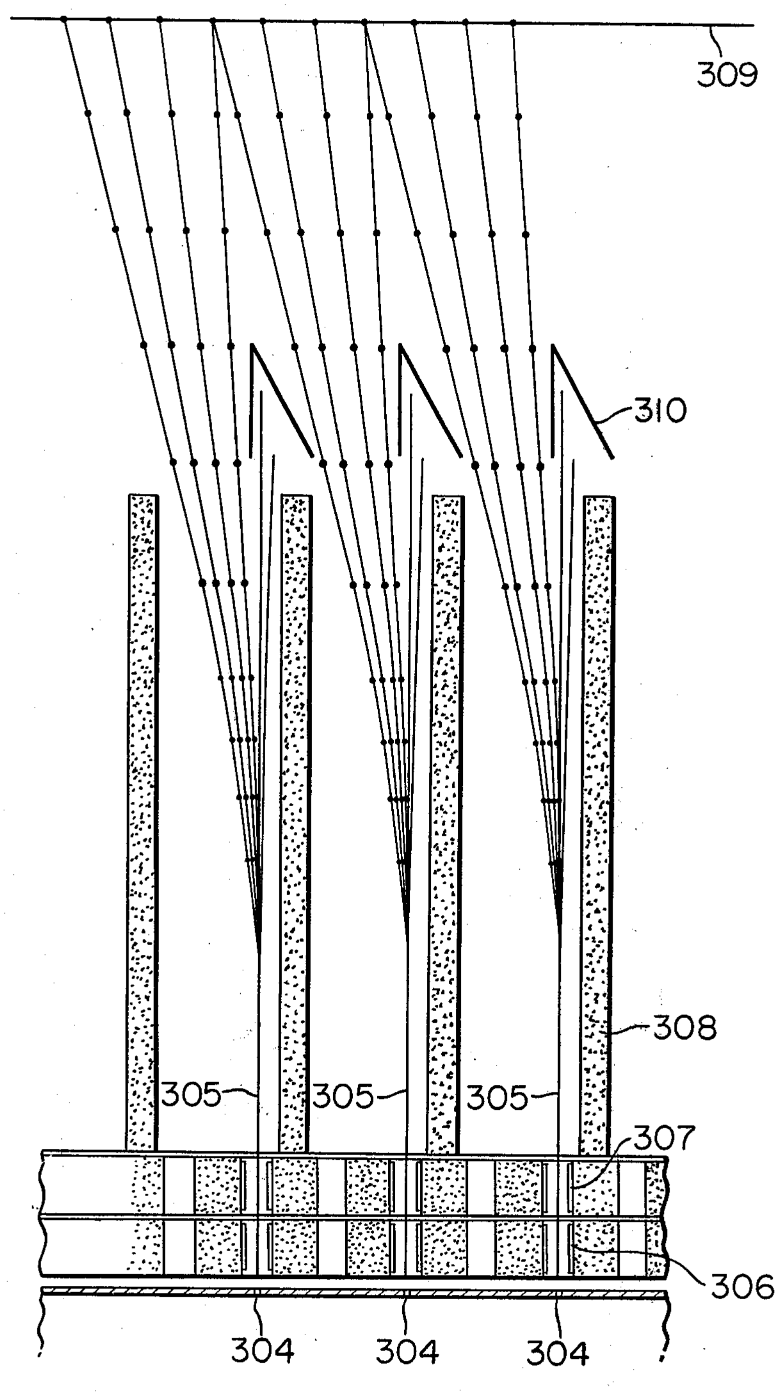
FIG. 11 is a partial top view in section of the charge deflection unit II shown in FIG. 2.
Figure 12:
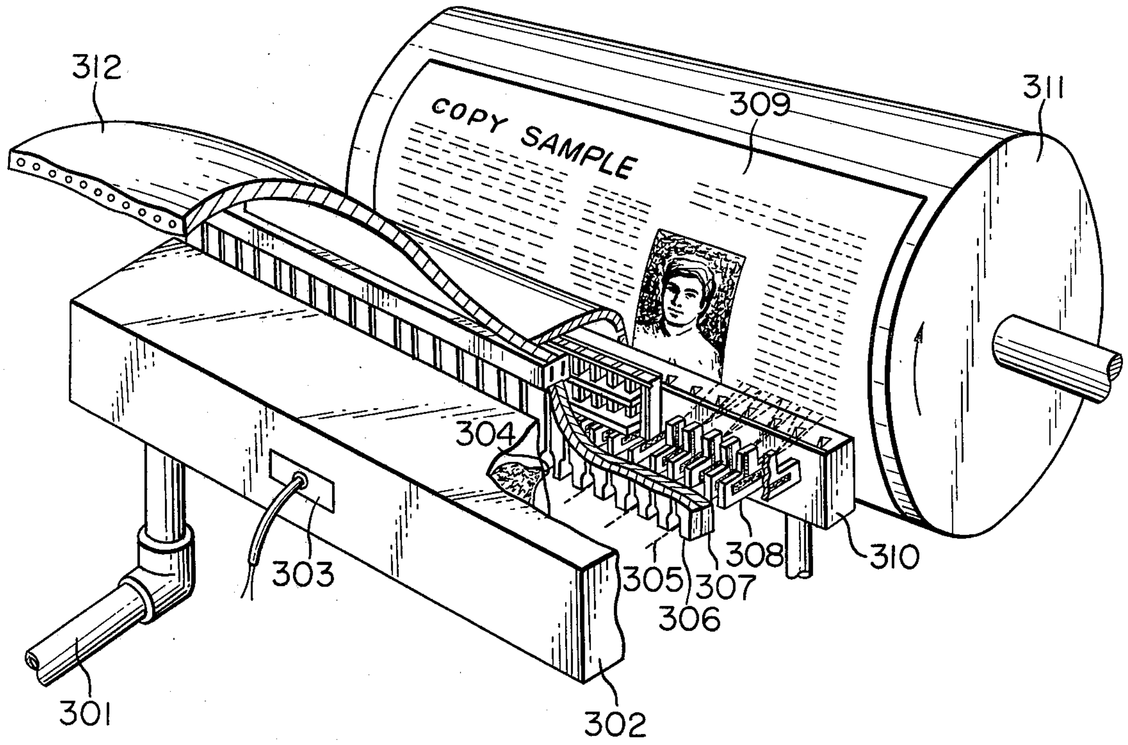
FIG. 12 is a perspective view of a printer incorporating the multiple deflection plate device in accordance with the present invention.

Referring to FIGS. 11 and 12, the ink is supplied through an ink inlet 301 and stored in a drop generator 302. In response to the pulses generated by a piezoelectric element 303, a stream of ink drops 305 issues through each orifice 304 of an orifice plate. A selected ink drop is charged by a charge electrode 306 and the charge on the ink drop is sensed by a charge sensor or detector 307. When the charged ink drop is passing between a pair of deflection plates 308, it is horizontally deflected through an angle which is dependent upon the charge on the ink drop and the deflected ink drop lands on a print surface 309. The ink drops which have not been charged are not deflected and trapped by gutters or ink catchers 310 for recirculation. As shown in FIG. 12, the printer includes a paper feed drum 311 and a lead cable 312 extended from the charge electrodes 306 and the charge detectors 307.

What is claimed is:

1. A multi-layer laminated multiple charge electrode device for a liquid jet printer, comprising:

a first insulating substrate plate having a plurality of downwardly opening U-shaped apertures adjacent a lower edge thereof;

a conductive first shield plate having one major surface secured to said first insulating substrate plate, said first shield plate having an insulating layer thereon and a corresponding plurality of downwardly opening U-shaped apertures adjacent said lower edge, the apertures of said first shield plate being smaller than the apertures of said first insulating substrate;

a conductive charge electrode layer on the surface of said first insulating substrate plate remote from said first shield plate, said charge electrode layer extending over the inner surfaces of said apertures of said first insulating substrate plate;

a second insulating substrate plate having one major surface secured to the other major surface of said first shield plate, said second insulating substrate plate having a corresponding plurality of downwardly opening U-shaped apertures adjacent said lower edge, the apertures of said first shield plate being smaller than the apertures of said second insulating substrate plate;

a conductive second shield plate having one major surface secured to the other major surface of said second insulating substrate plate, said second shield plate having an insulating layer thereon and a corresponding plurality of downwardly opening U-shaped apertures adjacent said lower edge, the apertures of said second shield plate being smaller than the apertures of said second insulating substrate plate; and a conductive charge sensor layer on a major surface of said second insulating plate, said charge sensor layer extending over the inner surfaces of said apertures of said second insulating substrate plate, whereby the aligned U-shaped apertures of said plates comprise a corresponding plurality of channels for charging, and sensing the charge upon streams of liquid droplets traversing said channels.

2. The device according to claim 1, wherein said device is upwardly retractable away from said streams, so that contamination of said plates by said droplets can be minimized.

* * * * *